US012759466B2

(12) United States Patent
Sobecki et al.

(10) Patent No.: US 12,759,466 B2
(45) Date of Patent: Oct. 13, 2026

(54) VEHICULAR DRIVER MONITORING SYSTEM

(71) Applicant: Magna Mirrors of America, Inc., Holland, MI (US)

(72) Inventors: Justin E. Sobecki, Rockford, MI (US); Austen C. Peterson, Hudsonville, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 240 days.

(21) Appl. No.: 18/533,243

(22) Filed: Dec. 8, 2023

(65) Prior Publication Data

US 2024/0190351 A1 Jun. 13, 2024

Related U.S. Application Data

(60) Provisional application No. 63/386,684, filed on Dec. 9, 2022.

(51) Int. Cl.

| | |
|---|---|
| ***B60R 1/29*** | (2022.01) |
| ***B60R 1/04*** | (2006.01) |
| ***B60R 1/12*** | (2006.01) |
| ***B60R 11/00*** | (2006.01) |
| ***B60R 11/04*** | (2006.01) |

(52) U.S. Cl.

CPC .................. *B60R 1/29* (2022.01); *B60R 1/04* (2013.01); *B60R 1/12* (2013.01); *B60R 11/04* (2013.01); *B60R 2001/1253* (2013.01); *B60R 2011/0085* (2013.01)

(58) Field of Classification Search

None

See application file for complete search history.

(56) References Cited

U.S. PATENT DOCUMENTS

| | | | |
|---|---|---|---|
| 6,093,976 A | 7/2000 | Kramer et al. | |
| 6,094,027 A | 7/2000 | Willmore et al. | |
| 6,382,806 B1 * | 5/2002 | Fuchs | B60R 1/072 359/877 |
| 6,698,905 B1 | 3/2004 | Whitehead | |
| 9,948,832 B2 | 4/2018 | Laroia | |
| 10,017,114 B2 | 7/2018 | Bongwald | |
| 10,046,706 B2 | 8/2018 | Larson et al. | |
| 10,065,574 B2 | 9/2018 | Tiryaki | |

(Continued)

*Primary Examiner* — Gelek W Topgyal

(74) *Attorney, Agent, or Firm* — HONIGMAN LLP

(57) ABSTRACT

A vehicular driver monitoring system includes an interior rearview mirror assembly having a mirror head adjustable about a mounting structure. A mirror reflective element and a camera are accommodated by the mirror head and the mirror reflective element and camera move together and in tandem with the mirror head when the mirror head is adjusted. A magnetic sensing device generates sensor data representative of an orientation of the mirror head relative to the mounting structure. The system, based on the sensor data generated by the magnetic sensing device, determines orientation of the mirror head relative to the mounting structure. With the mounting structure attached at the vehicle, image data captured by the camera is processed for monitoring of the driver of the vehicle, and image processing of image data is based at least in part on the determined orientation of the mirror head relative to the mounting structure.

22 Claims, 4 Drawing Sheets

(56) References Cited

U.S. PATENT DOCUMENTS

| | | | |
|---|---|---|---|
| 10,442,360 B2 | 10/2019 | LaCross et al. | |
| 10,958,830 B2 | 3/2021 | Koravadi | |
| 11,242,008 B2 | 2/2022 | Blank et al. | |
| 11,518,401 B2 | 12/2022 | Kulkarni | |
| 11,582,425 B2 | 2/2023 | Liu | |
| 11,639,134 B1 | 5/2023 | Huizen et al. | |
| 11,780,372 B2 | 10/2023 | Sobecki et al. | |
| 11,827,153 B2 | 11/2023 | Miller et al. | |
| 12,214,720 B2 | 2/2025 | Sobecki et al. | |
| 2007/0084070 A1* | 4/2007 | Honkura | G01C 17/38 33/356 |
| 2009/0040306 A1 | 2/2009 | Foote et al. | |
| 2012/0116632 A1* | 5/2012 | Bechtel | H04N 25/443 701/1 |
| 2012/0162430 A1 | 6/2012 | Heslin et al. | |
| 2014/0336876 A1 | 11/2014 | Gieseke et al. | |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0232030 A1 | 8/2015 | Bongwald | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2017/0217367 A1 | 8/2017 | Pflug et al. | |
| 2017/0274906 A1 | 9/2017 | Hassan et al. | |
| 2018/0222414 A1 | 8/2018 | Ihlenburg et al. | |
| 2018/0231976 A1 | 8/2018 | Singh | |
| 2019/0118717 A1 | 4/2019 | Blank et al. | |
| 2019/0210615 A1 | 7/2019 | Caron et al. | |
| 2020/0143560 A1 | 5/2020 | Lu et al. | |
| 2020/0202151 A1 | 6/2020 | Wacquant | |
| 2020/0320320 A1 | 10/2020 | Lynam | |
| 2021/0155167 A1 | 5/2021 | Lynam et al. | |
| 2021/0162926 A1 | 6/2021 | Lu | |
| 2021/0291739 A1 | 9/2021 | Kasarla et al. | |
| 2021/0323473 A1* | 10/2021 | Peterson | B60R 1/025 |
| 2021/0323477 A1* | 10/2021 | LaCross | B60R 1/04 |
| 2022/0161724 A1 | 5/2022 | Slama et al. | |
| 2022/0242438 A1 | 8/2022 | Sobecki et al. | |
| 2022/0254132 A1 | 8/2022 | Rother | |
| 2022/0377219 A1 | 11/2022 | Conger et al. | |
| 2024/0017670 A1 | 1/2024 | Martin | |
| 2024/0064274 A1 | 2/2024 | Blank et al. | |
| 2024/0168355 A1 | 5/2024 | Baur | |
| 2024/0174178 A1 | 5/2024 | Morey et al. | |
| 2024/0190456 A1 | 6/2024 | P et al. | |
| 2024/0223734 A1 | 7/2024 | Sobecki et al. | |

* cited by examiner

VEHICULAR DRIVER MONITORING SYSTEM

CROSS REFERENCE TO RELATED APPLICATION

The present application claims the filing benefits of U.S. provisional application Ser. No. 63/386,684, filed Dec. 9, 2022, which is hereby incorporated herein by reference in its entirety.

FIELD OF THE INVENTION

The present invention relates generally to a vehicular driver or occupant or cabin monitoring system for a vehicle and, more particularly, to a vehicular driver or occupant or cabin monitoring system that utilizes one or more cameras at an interior mirror of a vehicle.

BACKGROUND OF THE INVENTION

It is known to provide a mirror assembly that is adjustably mounted to an interior portion of a vehicle, such as via a single or double ball pivot or joint mounting configuration where the mirror head (including the mirror reflective element) is adjusted relative to the interior portion of a vehicle by pivotal movement about the pivot configuration. The mirror head and reflective element are adjustable by a user that is adjusting a rearward view.

SUMMARY OF THE INVENTION

A vehicular driver monitoring system or driving assist system or imaging system for a vehicle utilizes one or more cameras (preferably one or more CMOS cameras) to capture image data. The system may include an interior rearview mirror assembly having a mirror head adjustably attached at a mounting structure or base. The mounting structure is configured to attach at an interior portion of a vehicle. The mirror head includes a mirror reflective element. A driver monitoring camera is accommodated by the mirror head and moves with the mirror head when the mirror head is adjusted by the driver of the vehicle to adjust his or her rearward view. A light emitter may be accommodated by the mirror head and operable, when electrically powered to emit light, to emit near infrared (NIR) light. An electronic control unit (ECU) comprises electronic circuitry and associated software, and the electronic circuitry of the ECU comprises an image processor for processing image data captured by the camera. The mirror assembly includes a magnetic sensing device that operates to determine the location or position or orientation of the mirror head relative to the mounting structure, and the system, responsive to output of the magnetic sensing device, determines location or position and viewing angle of the camera. With the mounting structure attached at the interior portion of the vehicle, image data captured by the camera is processed at the ECU for an occupant monitoring function or a driver monitoring function, and the image processing at the ECU of captured image data is based at least in part on the determined location or position and viewing angle of the camera.

These and other objects, advantages, purposes and features of the present invention will become apparent upon review of the following specification in conjunction with the drawings.

DESCRIPTION OF THE PREFERRED EMBODIMENTS

Figure 1:
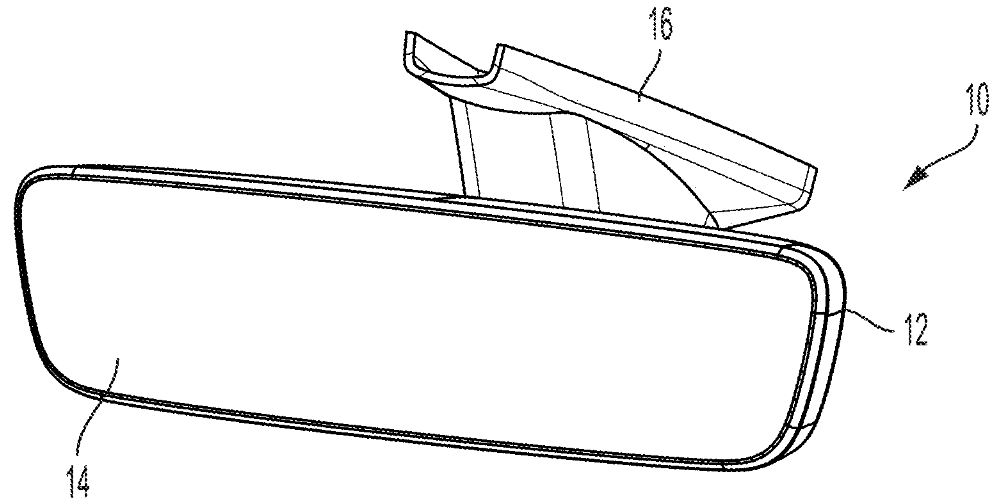
FIG. 1 is a perspective view of an interior rearview mirror assembly having a driver monitoring camera and a near infrared light emitter behind a reflective element of the interior rearview mirror assembly.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly or stay 16. The system includes a camera 18 disposed at and movable with the mirror head. For example, the camera 18 may be disposed behind the mirror reflective element 14 and view through the mirror reflective element 14 for capturing image data representative of the interior cabin of the vehicle, including the driver's head region and occupant region of the vehicle cabin. The system may utilize aspects of driver monitoring systems or occupant monitoring systems described in U.S. Publication No. US-2022-0377219 and/or International Publication Nos. WO 2023/034956; WO 2022/241423 and/or WO 2022/187805, and/or PCT Application No. PCT/US2023/021799, filed May 11, 2023, and published on Nov. 16, 2023 as International Publication No. WO 2023/220222 which are all hereby incorporated herein by reference in their entireties.

Figure 2:
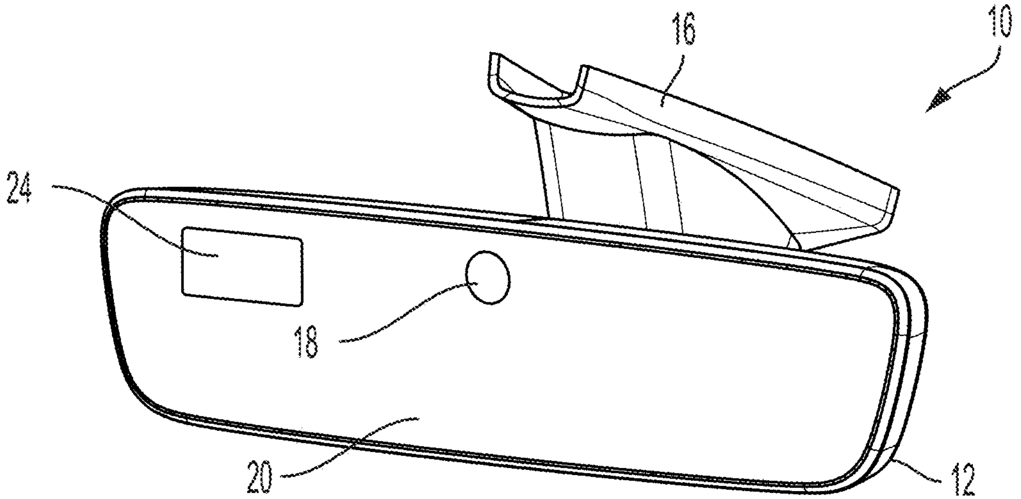
FIG. 2 is another perspective view of the interior rearview mirror assembly, showing the driver monitoring camera and light emitters without the reflective element.

The mirror assembly 10 includes or is associated with a driver monitoring system (DMS), with the mirror assembly 10 comprising the driver/occupant monitoring camera 18 disposed at a back plate 20 (and viewing through an aperture of the back plate) behind the reflective element 14 and viewing through the reflective element 14 toward at least a head region of the driver of the vehicle (FIG. 2).

The mirror assembly 10 includes a printed circuit board (PCB) (such as disposed at the back plate) having a control or control unit comprising electronic circuitry (e.g., disposed at the circuit board or substrate in the mirror casing), which includes driver circuitry for controlling dimming of the mirror reflective element 14. The circuit board (or a separate DMS circuit board) includes a processor that processes image data captured by the camera 18 for monitoring the driver and determining, for example, driver attentiveness and/or driver drowsiness. The driver monitoring system includes the driver monitoring camera 18 and may also include an occupant monitoring camera (or the driver monitoring camera may have a sufficiently wide field of view so as to view the occupant or passenger seat of the vehicle as well as the driver region), and may provide occupant detection and/or monitoring functions as part of an occupant monitoring system (OMS).

The DMS includes one or more infrared (IR) or near infrared (NIR) light emitter(s) 24, which may be disposed at the back plate 20 and may emit light, when electrically powered to emit light, that passes through another aperture of the back plate 20 and through the reflective element 14 to illuminate the head region of the driver of the vehicle. For example, the mirror assembly 10 may include one or more IR or NIR light emitting diodes (LEDs) or vertical-cavity surface-emitting lasers (VCSEL) or the like disposed at the back plate 20 behind the reflective element 14 and, when electrically powered to emit light, emitting near infrared light (or other nonvisible light) through the aperture of the back plate 20 and through the reflective element 14 toward the head region of the driver of the vehicle.

The interior rearview mirror 10 thus may include embedded cameras, IR/NIR illuminators and one or more processors for processing captured image data for the driver monitoring application. The inward facing camera 18 and light emitters 24 are fixed within the mirror head, and thus both components may be coupled with the mirror body. In these cases, the camera's field of view is subject to change from driver to driver as the mirror head is adjusted to set the driver's preferred rearward view provided by the mirror reflective element 14.

Figure 3:
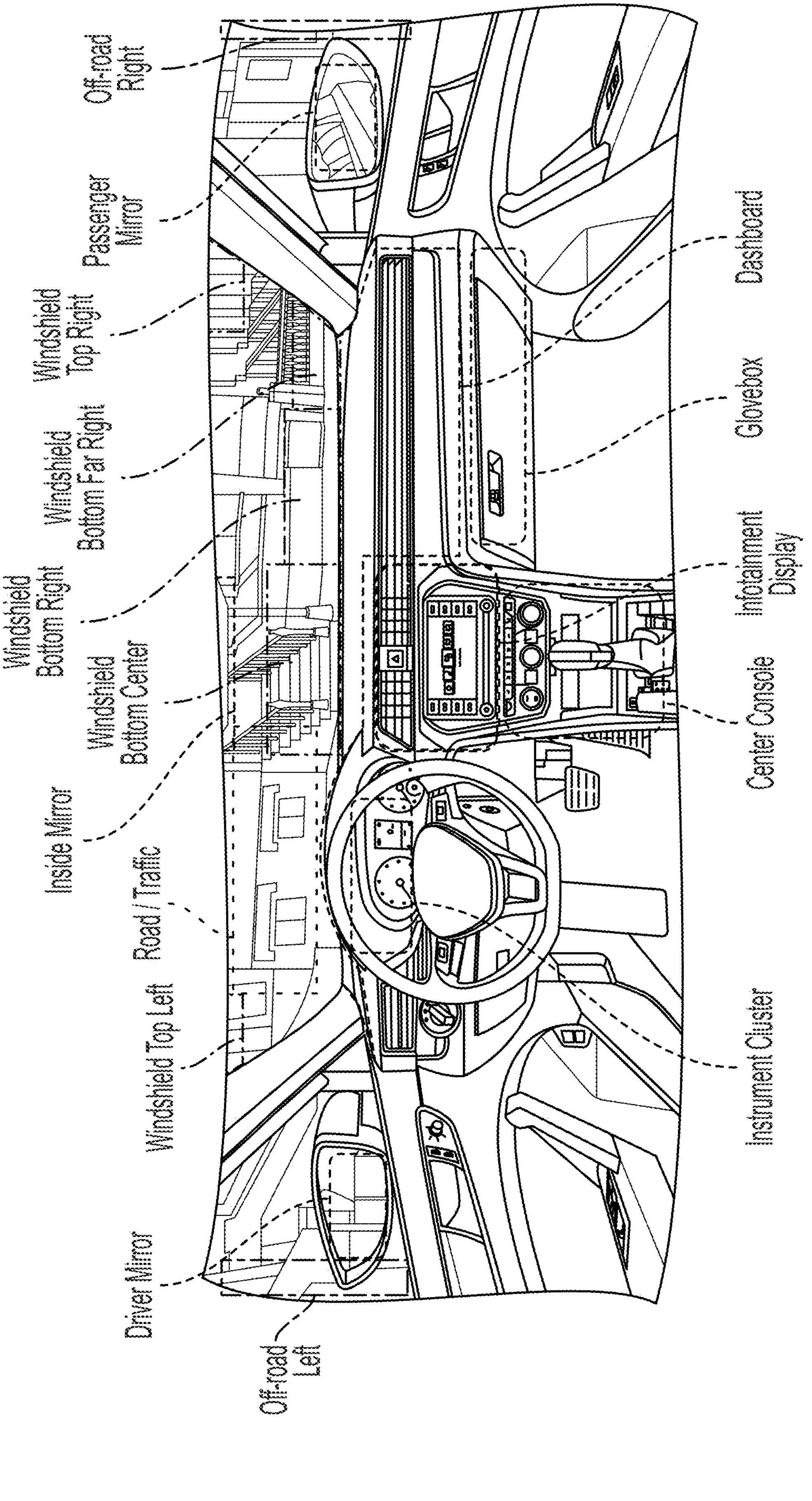
FIGS. 3 and 4 are views of an interior cabin of a vehicle, showing various areas that a driver may view while operating the vehicle.

Because the camera 18 moves with the mirror head, adjustment of the mirror head to set the driver's preferred rearward view changes the position and viewing direction or principal viewing axis of the camera 18 relative to the fixed base portion or mounting structure or stay 16, and thus relative to the vehicle. Responsive to image processing of image data captured by the DMS camera, DMS algorithms calculate or determine the driver eye gaze direction relative to the camera 18, and thus relative to the mirror head. Precise eye gaze direction analysis is important to understanding what part of the vehicle cabin the driver is looking at. This information allows the vehicle manufacturer to tailor their advanced driver or driving assistance systems (ADAS) to intervene appropriately when the user may be distracted and/or when the user is looking off the road (i.e., not looking ahead of where the vehicle is traveling along the road). FIG. 3 shows various locations where the system may determine that the driver is distracted or not looking in the right direction. For example, the system may determine that the driver is viewing an upper left region of the windshield or an upper right region of the windshield (e.g., at or near respective sun visors), a lower right region of the windshield or a lower center region of the windshield or a lower left region of the windshield, a driver-side exterior rearview mirror or a passenger-side exterior rearview mirror, a driver-side window or a passenger-side window, an interior rearview mirror assembly, an instrument cluster, an infotainment display, a dashboard, a glovebox, a center console region, and the like. The system may determine that the driver is properly viewing the road when viewing forward of the vehicle through the windshield at the driver-side of the vehicle.

Figure 4:
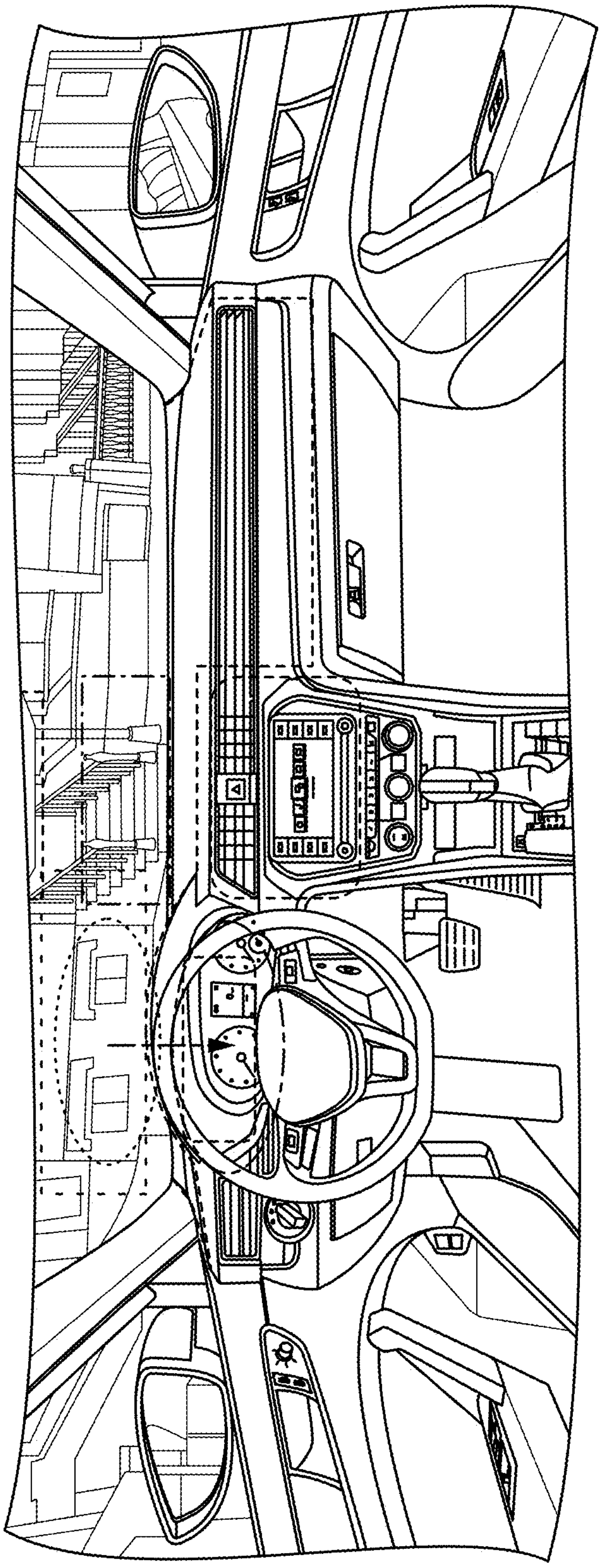

Understanding eye gaze direction relative to the camera 18 is increasingly complicated when the camera 18 is packaged inside a movable object, such as the mirror head of the interior rearview mirror assembly 10. Moving the mirror/camera without compensation can yield inaccurate determination of the drivers 'gaze zone.' In other words, if the orientation of the mirror head and position and viewing direction of the camera 18 is not accurately known or determined, the system may erroneously determine that the driver is looking forward of the vehicle when the driver is actually looking to one side or another or downward toward the instrument panel (see FIG. 4).

Figure 5:
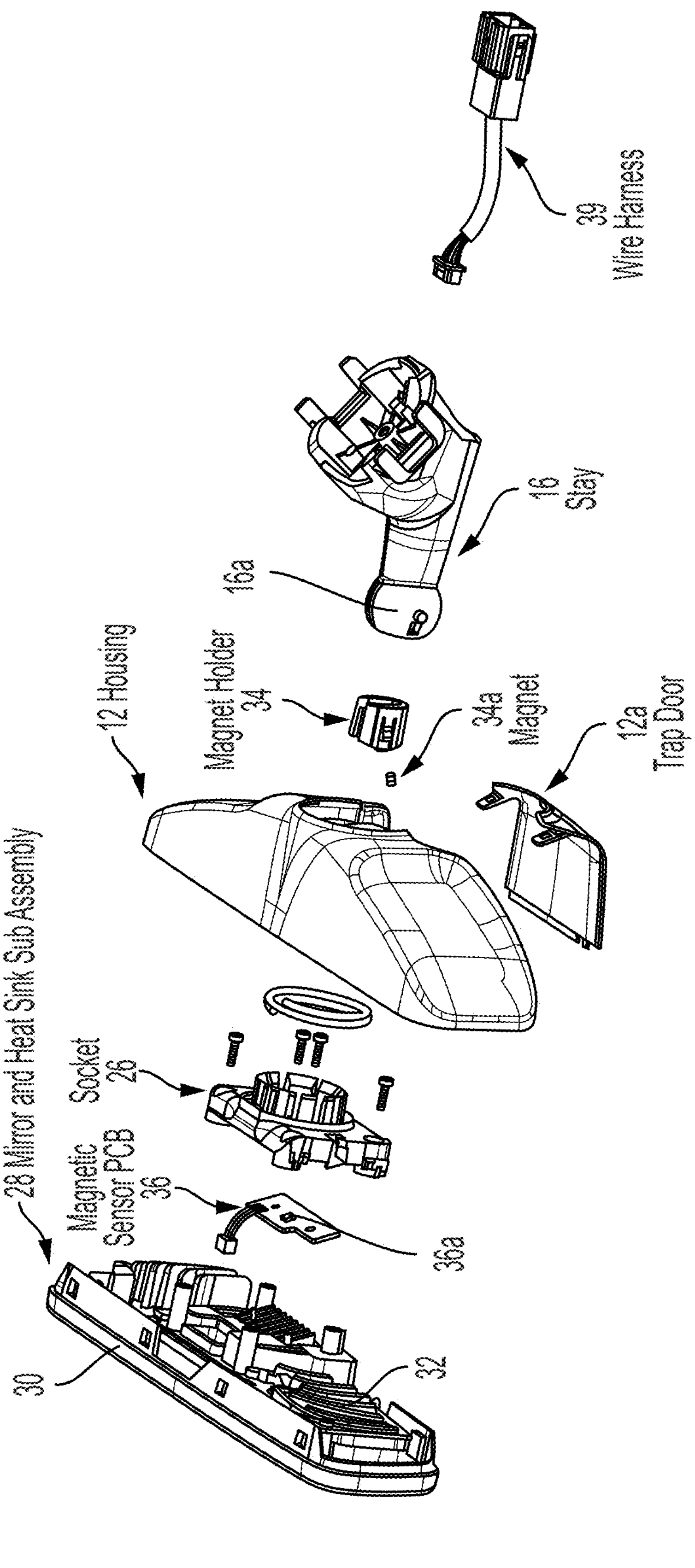
FIG. 5 is an exploded perspective view of the interior rearview mirror assembly.

The interior rearview mirror assembly 10 includes a magnetic sensing device 36 having a magnetic sensor **36*a* and magnetic element 34*a* at the ball joint to determine orientation of the mirror head relative to the fixed base or stay 16. As shown in FIG. 5, the interior rearview mirror assembly 10 includes the base or stay 16, which has a ball member 16*a* that is pivotally received in a socket 26 attached at the rear of the mirror reflective element assembly 28. The mirror reflective element assembly 28 includes the mirror reflective element 14 and the back plate 20, which may include a bezel or casing portion 30 and a heat sink 32. A magnet holder 34 is disposed at the stay (such as at or integrated with the ball member 16*a*) and holds a magnetic element or magnet 34*a* at the ball member 16*a*, and a magnetic sensor PCB 36 is disposed at the mirror reflective element assembly 28 and at the socket 26. A wire harness 38 is at the stay 16 and has wires that pass through the arm and ball member 16*a* of the stay 16 to electrically connect to a connector at the magnetic sensor PCB 36 (and optionally to electrically connect to electrochromic dimming circuitry of an electrochromic mirror reflective element and/or to circuitry of the DMS printed circuit board, such as to power and communicate with the DMS camera and light emitter). The mirror head includes a mirror housing or casing 12 (which may include a removable lower panel or "trap door" 12*a*** that allows for access to the internal content of the mirror head).

Thus, the mirror head has an integrated three-dimensional (3D) magnetic sensor (hall effect sensor) **36*a* at the sensor PCB 36 that detects the mirror head location relative to the mirror mount stay 16. The hall effect sensor 36*a* can detect the strength and direction of the magnetic field produced by the magnet 34*a* and the system can, based on the output of the sensor or sensing device 36*a*, determine the orientation of the mirror head relative to the stay 16. In doing so, the position of the mirror head and camera 18** is always known to the DMS algorithms such that appropriate gaze directions can be determined.

The magnetic sensor **36*a* at the PCB 36 may comprise a 3D hall effect sensor, such as a TRIAXIS sensor commercially available from Melexis, or such as an Allegro ALS31313 sensor or other suitable sensor. The sensor 36*a* enables a planar IC of 3D magnetic field measurement and brings mechanical flexibility, with mounting in almost any orientation. The sensor 36*a* is capable of high operating temperature (e.g., up to 125 degrees Celsius or greater) and provides angle computation stability versus temperature variations, magnetic tolerances, and mechanical tolerances, and allows a smaller and cost-effective magnet to be used. The sensor 36*a*** may have an I2C output and may provide a low voltage/low power application.

The magnet holder 34 may be integrated into the ball member **16*a* or coupled to the ball member 16*a*, such as clipped into position at the ball member 16*a*. The magnet 34*a* is received in the magnet holder 34 and provides the magnetic field that generates the detected voltage change at the 3D hall effect sensor 36*a***.

With the DMS camera 18 disposed in the mirror head, the camera 18 moves with the mirror head (including the mirror casing and mirror reflective element that pivot at a pivot joint that pivotally connects the mirror head to the mounting structure of the interior rearview mirror assembly that in turn mounts at a windshield or at a headliner of the equipped vehicle), such that, when the driver adjusts the mirror head relative to the mounting structure 16 to adjust the view rearward, the position and viewing angle of the camera 18 is adjusted as well. The system may be established or programmed or set such that the camera 18 is at a known location and orientation relative to a baseline or initial position/orientation of the mirror head, whereby the magnet **34*a* at the stay 16** is at a known position relative to the sensor

36*a* at the reflective element assembly. Movement of the mirror head, and thus the camera 18, moves the sensor 36*a* relative to the magnet 34*a*. That is, as the mirror head pivots and the socket pivots relative to the fixed ball 16*a* and stay 16, the sensor 36*a* moves about the magnet 34*a* in three axes, and the processor and system can determine the degree of movement and thus the current position of the sensor 36*a* relative to the magnet 34*a*, and thus the current position of the mirror head (and camera) relative to the stay 16. The circuitry and algorithm tracks the movement of the sensor 36*a* and determines the position of the sensor 36*a* relative to the magnet 34*a* and determines the change in position and orientation of the camera 18. The system thus provides a non-contacting sensing device (where the sensor and the magnet do not contact one another as the mirror head is adjusted and the sensor moves relative to the magnet) that can calculate or determine the orientation of the camera 18 and the viewing direction or principal viewing axis of the camera 18 responsive to processing of the sensor output.

The location of the DMS camera and IR LED(s) at the mirror head provides an unobstructed view to the driver. The DMS preferably is self-contained in the interior rearview mirror assembly 10 and thus may be readily implemented in a variety of vehicles, including existing vehicles and different models of the same vehicle brand (for example, in a BMW 3-series model and in a BMW X3 model and in a BMW 5-series model and in a BMW X5 model and in an BMW 7-series model, etc.). The driver monitoring camera may also provide captured image data for an occupancy monitoring system (OMS) or another separate camera may be disposed at the mirror assembly for the OMS function.

The mirror assembly 10 may also include one or more infrared (IR) or near infrared light emitters (such as IR or near-IR light emitting diodes (LEDs) or vertical-cavity surface-emitting lasers (VCSEL) or the like) disposed at the back plate 20 behind the reflective element 14 and emitting near infrared light through the aperture of the back plate 20 and through the reflective element 14 toward the head region of the driver of the vehicle. The IR emitter device comprises an IR emitter or LED printed circuit board, with a first set of near infrared light emitting diodes (e.g., a set of wider beam LEDs) at one part of the LED PCB and a second set of near infrared light emitting diodes (e.g., a set of narrower beam LEDs) at another part of the LED PCB. The LED PCB may have one part angled relative to the other part so that the first set of LEDs or the second set of LEDs may be operated to emit light in a desired direction depending on the orientation of the mirror head. For example, the first set of near infrared light emitting diodes may be angled toward the left side of the vehicle so as to be directed toward a driver of a left hand drive vehicle (if the mirror assembly is installed in a left hand drive vehicle and the first set of near infrared light emitting diodes are enabled for the driver monitoring function), while the second set of near infrared light emitting diodes may be angled toward the right side of the vehicle so as to be directed toward a driver of a right hand drive vehicle (if the mirror assembly is installed in a right hand drive vehicle and the second set of near infrared light emitting diodes are enabled for the driver monitoring function).

Conventional driver monitoring systems (DMS) in likes of BMW, Ford, GM, Tesla, and Subaru vehicles (for example, for GM SuperCruise™ or for Ford's BlueCruise™ as described in https://www.consumerreports.org/car-safety/driver-monitoring-systems-ford-gm-earn-points-in-cr-tests-a6530426322) are "Two-Box" DMS in that (i) the camera used to monitor the driver's head/eyes and the near-IR emitting light sources that illuminate the driver's head/eyes are accommodated in a first box or module (that is usually located at the steering column of an equipped vehicle or in an overhead region of the equipped vehicle) and (ii) the electronics/software used to analyze captured image data to determine the driver's gaze direction or head position or eye movement or alertness or drowsiness is accommodated in a separate second box or module that is located remote from and at a distance from the first box and that connects to the first box typically via a wired connection (the second box typically comprises an ECU that can be part of a head unit of the equipped vehicle and that besides DMS, optionally can provide other features).

A "One-Box" DMS interior rearview mirror assembly has both the camera used to monitor the driver's head/eyes and the near-IR emitting light sources that illuminate the driver's head/eyes accommodated by an interior rearview mirror assembly (and preferably, are both accommodated within the mirror head of the interior rearview mirror assembly). Thus, the one-box DMS interior rearview mirror assembly allows an original equipment manufacturer (OEM) of vehicles (such as for example VW or Toyota or Honda or GM or Ford) to equip vehicles with the likes of a DMS interior rearview mirror assembly that includes the camera/illumination sources/driver monitoring software/associated driver monitoring electronic circuitry such as data processing chip(s), memory, electronic components, printed circuit board(s) that includes data processing chip(s), memory, electronic components, light sensors for detecting glare and ambient lighting, and that includes power supplies, electrical connector(s), heat sink(s), mechanical parts, etc. The One-Box Interior DMS Rearview Mirror Assembly thus can be purchased by an OEM from an interior rearview mirror assembly manufacturer and can be installed by that OEM into a being-assembled vehicle (typically mounting to a mirror mounting button or similar element that is adhered to the in-cabin side of the windshield of the vehicle). To operate in the equipped vehicle, the One-Box Interior DMS Rearview Mirror Assembly connects to a vehicle wiring harness of the vehicle and is supplied via this vehicle wiring harness with ignition voltage (nominal 12V DC but can vary from 9V (6V for automatic stop/start) to 16V or so depending on the vehicle type and the operating condition of the vehicle). The one-box Interior DMS rearview mirror assembly via this wiring harness is supplied with vehicle data, such data including vehicle and other data supplied via a CAN bus or link (that can carry to the mirror vehicle information and that can carry from the mirror distraction alerts, etc.) or supplied via a Local Area Network (LIN) bus or line.

In the illustrated embodiment, the camera 18 and light emitters 24 are disposed behind the mirror reflective element 14, which may a prismatic mirror reflective element or an electro-optic (such as electrochromic or EC) mirror reflective element. The mirror casing 12 may include a plastic bezel portion 30 that circumscribes the perimeter edge of the mirror reflective element 14 and that provides an outer curved surface that transitions from the outer surface of the mirror casing 12 to the planar front surface of the mirror reflective element 14 (optionally with no part of the plastic bezel portion overlapping or overlaying onto the planar front surface of the mirror reflective element), such that the plastic bezel 30 completes the homologated edge. Optionally, the mirror reflective element 14 may provide an exposed outer curved surface that transitions from the outer surface of the mirror casing 12 to the planar front surface of the mirror reflective element 14.

The light emitter 24 may have two or three sets of LEDs disposed on the circuit board. One set of LEDs emits a wider beam of near infrared light when energized (e.g., four wider beam LEDs) and another set of LEDs emits a narrower beam of near infrared light when energized (e.g., four narrower beam LEDs). The narrower beam LEDs may be powered or energized for the driver monitoring function, while the wider beam LEDs may be powered or energized for the occupant monitoring function (and may be episodically energized for illuminating particular frames of captured image data, such as by utilizing aspects of the systems described in International Publication Nos. WO 2022/241423 and/or WO 2022/187805, which are hereby incorporated herein by reference in their entireties).

The narrow beam LEDs may be angled or canted or biased (e.g., by ten degrees or thereabouts) toward the left and thus toward the driver of a left hand drive vehicle, while the wider beam LEDs are not biased toward either side. When the mirror assembly is installed in a left hand drive vehicle, the narrow beam LEDs illuminate the driver's head region while the wider beam LEDs illuminate the passenger area as well as the driver area. However, when the mirror assembly is installed in a right hand drive vehicle, the narrow beam LEDs do not illuminate the driver's head region while the wider beam LEDs illuminate the passenger area as well as the driver area.

The mirror assembly may include a near infrared light emitter that is configured and operable to selectively emit light toward the driver head region when the mirror assembly is disposed in a left hand drive vehicle (with the driver sitting in a left side driver seat) or when the mirror assembly is disposed in a right hand drive vehicle (with the driver sitting in a right side driver seat). The system provides for DMS/OMS illumination that is software configurable based on vehicle data for the country code. For example, the DMS light emitters may comprise two or three separate banks/groups/sets of emitters or LEDs. One group is aimed or angled toward the left hand side of the vehicle and one group is aimed or angled toward the right hand side of the vehicle. Optionally, there is a third group that is aimed somewhere in between (for example, the third group may be directed perpendicular to the mirror surface). These groups or sets can be made up of various combinations of wide and narrow LEDs or VCSELs.

Thus, the vehicular interior rearview mirror assembly is associated with a driver monitoring system (DMS) and/or occupant monitoring system (OMS) of the vehicle. The interior rearview mirror assembly includes the mirror head adjustably attached to mounting structure that attaches at an interior portion of a cabin of the vehicle. For example, the mounting structure includes the mirror stay 16 with the ball member 16*a* at the end of the arm of the mirror stay 16. The mirror head accommodates the mirror reflective element 14 that includes the mirror reflective coating disposed at the rear surface of the glass substrate of the mirror reflective element 14. The mirror head accommodates the camera 18 and the camera 18 moves together and in tandem with the mirror head when the mirror head is adjusted to set the rearward view of the driver of the vehicle. The camera 18 may view through the glass substrate and the mirror reflective coating of the mirror reflective element 14. The mirror head may accommodate the ECU (or the ECU may be disposed at the vehicle remote from the mirror head or remote from the mirror assembly), which includes electronic circuitry (which may include, for example, an image data processor) and associated software, and the ECU processes image data captured by the camera for an occupant monitoring function and/or a driver monitoring function. To improve accuracy of the DMS and/or OMS, the mirror assembly includes a magnetic sensing device that captures sensor data representative of a location or position or orientation of the mirror head relative to the mounting structure 16 as the mirror head is adjusted relative to the mounting structure 16. Based on the captured sensor data, the system determines position and viewing angle of the camera 18 and the image data is processed based at least in part on the determined position and viewing angle.

In some examples, the magnetic sensing device includes a magnetic hall effect sensor 36*a* and a magnet 34*a*. The hall effect sensor 36*a* and magnet 34*a* may be positioned at a pivot joint connecting or mounting the mirror head to the mounting structure 16, such as at or near the ball member 16*a* and the socket 26 at the mirror head. For example, the hall effect sensor 36*a* may be disposed at the PCB 36 disposed at or near or behind the socket 26 and the magnet 34*a* may be disposed at the magnet holder 34 disposed at or near or integrated with the ball member 16*a* of the mounting structure 16.

The mirror head may accommodate a light emitter 24, such as a light emitter that is electrically operable to emit near infrared (NIR) light. The light emitter 24 may include a plurality of light emitting didoes (LEDs) or a plurality of vertical-cavity surface-emitting lasers (VCSEL). Further, the light emitter 24 may be disposed within the mirror head behind the mirror reflective element 14 and operable to emit light through the mirror reflective element 14 to illuminate at least a portion of the interior cabin of the vehicle.

In some examples, the mirror assembly may have a chin portion or region that extends along and below the lower edge of the mirror reflective element to accommodate the camera and/or the light emitters at the lower edge of the mirror reflective element. For example, the mirror reflective element may include a video display screen that extends along the mirror reflective element above the chin region and the camera may be accommodated at the chin region below the video display screen so that the camera views through the mirror reflective element and not through the video display screen. Optionally, a separate light transmitting cover element or portion of the glass substrate (e.g., a portion of a front glass substrate of an electrochromic mirror reflective element) extends over the chin region so that the camera views through the cover element or portion of the glass substrate, whereby the camera may not view through the mirror reflector of the mirror reflective element.

The system may utilize aspects of driver monitoring systems and/or head and face direction and position tracking systems and/or eye tracking systems and/or gesture recognition systems. Such head and face direction and/or position tracking systems and/or eye tracking systems and/or gesture recognition systems may utilize aspects of the systems described in U.S. Pat. Nos. 11,518,401; 10,958,830; 10,065,574; 10,017,114; 9,405,120 and/or 7,914,187, and/or U.S. Publication Nos. US-2022-0377219; US-2022-0254132; US-2022-0242438; US-2021-0323473; US-2021-0291739; US-2020-0320320; US-2020-0202151; US-2020-0143560; US-2019-0210615; US-2018-0231976; US-2018-0222414; US-2017-0274906; US-2017-0217367; US-2016-0209647; US-2016-0137126; US-2015-0352953; US-2015-0296135; US-2015-0294169; US-2015-0232030; US-2015-0092042; US-2015-0022664; US-2015-0015710; US-2015-0009010 and/or US-2014-0336876, and/or International Publication Nos. WO 2023/034956; WO 2022/241423 and/or WO 2022/187805, and/or PCT Application No. PCT/US2023/021799, filed May 11, 2023, and published on Nov. 16, 2023 as International Publication No. WO 2023/220222 which are hereby incorporated herein by reference in their entireties.

Optionally, the driver monitoring system may be integrated with a camera monitoring system (CMS) of the vehicle. The integrated vehicle system incorporates multiple inputs, such as from the inward viewing or driver monitoring camera and from the forward or outward viewing camera, as well as from a rearward viewing camera and sideward viewing cameras of the CMS, to provide the driver with unique collision mitigation capabilities based on full vehicle environment and driver awareness state. The image processing and detections and determinations are performed locally within the interior rearview mirror assembly and/or the overhead console region, depending on available space and electrical connections for the particular vehicle application. The CMS cameras and system may utilize aspects of the systems described in U.S. Pat. No. 11,242,008 and/or U.S. Publication Nos. US-2021-0162926; US-2021-0155167; US-2018-0134217 and/or US-2014-0285666, and/or International PCT Publication No. WO 2022/150826, which are all hereby incorporated herein by reference in their entireties.

The ECU may receive image data captured by a plurality of cameras of the vehicle, such as by a plurality of surround view system (SVS) cameras and a plurality of camera monitoring system (CMS) cameras and optionally one or more driver monitoring system (DMS) cameras. The ECU may comprise a central or single ECU that processes image data captured by the cameras for a plurality of driving assist functions and may provide display of different video images to a video display screen in the vehicle (such as at an interior rearview mirror assembly or at a central console or the like) for viewing by a driver of the vehicle. The system may utilize aspects of the systems described in U.S. Pat. Nos. 11,242,008; 10,442,360 and/or 10,046,706, and/or U.S. Publication Nos. US-2021-0155167 and/or US-2019-0118717, and/or U.S. Publication No. US-2021-0162926 and/or International PCT Publication No. WO 2022/150826, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, and/or U.S. Publication Nos. US-2020-0039447; US-2015-0327398; US-2015-0015713; US-2014-0160284; US-2014-0226012 and/or US-2009-0295181, which are all hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular driver monitoring system, the vehicular driver monitoring system comprising:

an interior rearview mirror assembly comprising a mirror head pivotally adjustable about a mounting structure via a pivot joint, wherein the mounting structure is configured to attach at an interior portion of a cabin of a vehicle equipped with the vehicular driver monitoring system;

wherein the mirror head accommodates a mirror reflective element;

wherein the mirror reflective element comprises a glass substrate and a mirror reflector coating disposed at the glass substrate;

a camera accommodated by the mirror head, wherein, with the mounting structure attached at the interior portion of the cabin of the vehicle, the camera views within the cabin of the vehicle;

wherein the camera and the mirror reflective element move together and in tandem with the mirror head when, with the mounting structure attached at the interior portion of the cabin of the vehicle, the mirror head is pivotally adjusted about the mounting structure to provide a rearward view for a driver of the vehicle;

an electronic control unit (ECU);

wherein image data captured by the camera is transferred to the ECU;

wherein the ECU comprises electronic circuitry and associated software, and wherein the electronic circuitry of the ECU comprises an image processor operable to process image data captured by the camera and transferred to the ECU;

a magnetic sensing device that comprises (i) a magnetic hall effect sensor disposed at a first pivot element of the pivot joint and (ii) a magnet disposed at a second pivot element of the pivot joint;

wherein, as the mirror head is pivotally adjusted about the mounting structure, the magnetic hall effect sensor and the first pivot element pivot relative to the magnet and the second pivot element;

wherein the magnetic sensing device, based on movement of the magnetic hall effect sensor relative to the magnet, generates sensor data representative of an orientation of the mirror head relative to the mounting structure;

wherein the vehicular driver monitoring system, based on sensor data generated by the magnetic sensing device, determines orientation of the mirror head relative to the mounting structure; and wherein, with the mounting structure attached at the interior portion of the cabin of the vehicle, image data captured by the camera is transferred to and is processed at the ECU for monitoring of the driver of the vehicle, and wherein image processing at the ECU of image data captured by the camera and transferred to the ECU is based at least in part on the determined orientation of the mirror head relative to the mounting structure.

2. The vehicular driver monitoring system of claim 1, wherein the camera views through the mirror reflector coating of the mirror reflective element.

3. The vehicular driver monitoring system of claim 1, wherein the first pivot element comprises a ball member and the second pivot element comprises a socket element.

4. The vehicular driver monitoring system of claim 1, wherein the mounting structure comprises the first pivot element and the mirror head comprises the second pivot element.

5. The vehicular driver monitoring system of claim 1, comprising a light emitter accommodated by the mirror head and movable together and in tandem with the mirror head when the mirror head is pivotally adjusted about the mounting structure, wherein the light emitter is operable, when electrically powered, to emit near infrared (NIR) light.

6. The vehicular driver monitoring system of claim 5, wherein the light emitter comprises a plurality of near infrared light emitting diodes.

7. The vehicular driver monitoring system of claim 5, wherein the light emitter is disposed within the mirror head and behind the mirror reflective element, and wherein the light emitter, when electrically powered, emits near infrared light that passes through the mirror reflective element.

8. The vehicular driver monitoring system of claim 1, wherein the ECU is accommodated by the mirror head.

9. The vehicular driver monitoring system of claim 1, wherein the mirror head comprises a chin portion at a lower edge region of the mirror head, and wherein the camera is at least partially accommodated by the chin portion of the mirror head.

10. The vehicular driver monitoring system of claim 9, wherein the camera does not view through the mirror reflector coating of the mirror reflective element.

11. The vehicular driver monitoring system of claim 1, wherein the interior portion of the cabin of the vehicle comprises an in-cabin side of a windshield of the vehicle.

12. A vehicular driver monitoring system, the vehicular driver monitoring system comprising:

an interior rearview mirror assembly comprising a mirror head pivotally adjustable about a mounting structure via a pivot joint, wherein the mounting structure is configured to attach at an interior portion of a cabin of a vehicle equipped with the vehicular driver monitoring system;

wherein the mirror head accommodates a mirror reflective element;

wherein the mirror reflective element comprises a glass substrate and a mirror reflector coating disposed at the glass substrate;

a camera accommodated by the mirror head, wherein, with the mounting structure attached at the interior portion of the cabin of the vehicle, the camera views within the cabin of the vehicle, and wherein the camera views through the mirror reflective element;

a light emitter accommodated by the mirror head and operable, when electrically powered, to emit near infrared (NIR) light, wherein the light emitter is disposed within the mirror head and behind the mirror reflective element, and wherein the light emitter, when electrically powered, emits near infrared light that passes through the mirror reflective element;

wherein the camera, the light emitter and the mirror reflective element move together and in tandem with the mirror head when, with the mounting structure attached at the interior portion of the cabin of the vehicle, the mirror head is pivotally adjusted about the mounting structure to provide a rearward view for a driver of the vehicle;

an electronic control unit (ECU) accommodated by the mirror head;

wherein image data captured by the camera is transferred to the ECU;

wherein the ECU comprises electronic circuitry and associated software, and wherein the electronic circuitry of the ECU comprises an image processor operable to process image data captured by the camera and transferred to the ECU;

a magnetic sensing device that comprises (i) a magnetic hall effect sensor disposed at a first pivot element of the pivot joint and (ii) a magnet disposed at a second pivot element of the pivot joint;

wherein, as the mirror head is pivotally adjusted about the mounting structure, the magnetic hall effect sensor and the first pivot element pivot relative to the magnet and the second pivot element;

wherein the magnetic sensing device, based on movement of the magnetic hall effect sensor relative to the magnet, generates sensor data representative of an orientation of the mirror head relative to the mounting structure;

wherein the vehicular driver monitoring system, based on sensor data generated by the magnetic sensing device, determines orientation of the mirror head relative to the mounting structure; and wherein, with the mounting structure attached at the interior portion of the cabin of the vehicle, image data captured by the camera is transferred to and is processed at the ECU for monitoring of the driver of the vehicle, and wherein image processing at the ECU of image data captured by the camera and transferred to the ECU is based at least in part on the determined orientation of the mirror head relative to the mounting structure.

13. The vehicular driver monitoring system of claim 12, wherein the camera views through the mirror reflector coating of the mirror reflective element.

14. The vehicular driver monitoring system of claim 12, wherein the mounting structure comprises the first pivot element of the pivot joint and the mirror head comprises the second pivot element of the pivot joint.

15. The vehicular driver monitoring system of claim 12, wherein the light emitter comprises a plurality of near infrared light emitting diodes.

16. The vehicular driver monitoring system of claim 12, wherein the interior portion of the cabin of the vehicle comprises an in-cabin side of a windshield of the vehicle.

17. A vehicular driver monitoring system, the vehicular driver monitoring system comprising:

an interior rearview mirror assembly comprising a mirror head pivotally adjustable about a mounting structure via a pivot joint, wherein the mounting structure is configured to attach at an interior portion of a cabin of a vehicle equipped with the vehicular driver monitoring system;

wherein the mirror head accommodates a mirror reflective element;

wherein the mirror reflective element comprises a glass substrate and a mirror reflector coating disposed at the glass substrate;

a camera accommodated by the mirror head, wherein, with the mounting structure attached at the interior portion of the cabin of the vehicle, the camera views within the cabin of the vehicle, and wherein the camera does not view through the mirror reflector coating of the mirror reflective element;

wherein the camera and the mirror reflective element move together and in tandem with the mirror head when, with the mounting structure attached at the interior portion of the cabin of the vehicle, the mirror head is pivotally adjusted about the mounting structure to provide a rearward view for a driver of the vehicle;

an electronic control unit (ECU) disposed at the vehicle remote from the mirror head;

wherein image data captured by the camera is transferred to the ECU;

wherein the ECU comprises electronic circuitry and associated software, and wherein the electronic circuitry of the ECU comprises an image processor operable to process image data captured by the camera and transferred to the ECU;

a magnetic sensing device that comprises (i) a magnetic hall effect sensor disposed at a first pivot element of the pivot joint and (ii) a magnet disposed at a second pivot element of the pivot joint;

wherein, as the mirror head is pivotally adjusted about the mounting structure, the magnetic hall effect sensor and the first pivot element pivot relative to the magnet and the second pivot element;

wherein the magnetic sensing device, based on movement of the magnetic hall effect sensor relative to the magnet, generates sensor data representative of an orientation of the mirror head relative to the mounting structure;

wherein the vehicular driver monitoring system, based on sensor data generated by the magnetic sensing device, determines orientation of the mirror head relative to the mounting structure; and wherein, with the mounting structure attached at the interior portion of the cabin of the vehicle, image data captured by the camera is transferred to and is processed at the ECU for monitoring of the driver of the vehicle, and wherein image processing at the ECU of image data captured by the camera and transferred to the ECU is based at least in part on the determined orientation of the mirror head relative to the mounting structure.

18. The vehicular driver monitoring system of claim 17, comprising a light emitter accommodated by the mirror head and movable together and in tandem with the mirror head when the mirror head is pivotally adjusted about the mounting structure, wherein the light emitter is operable, when electrically powered, to emit near infrared (NIR) light.

19. The vehicular driver monitoring system of claim 18, wherein the light emitter comprises a plurality of near infrared light emitting diodes.

20. The vehicular driver monitoring system of claim 18, wherein the light emitter is disposed within the mirror head and behind the mirror reflective element, and wherein the light emitter, when electrically powered, emits near infrared light that passes through the mirror reflective element.

21. The vehicular driver monitoring system of claim 17, wherein the mirror head comprises a chin portion at a lower edge region of the mirror head, and wherein the camera is at least partially accommodated by the chin portion of the mirror head.

22. The vehicular driver monitoring system of claim 17, wherein the interior portion of the cabin of the vehicle comprises an in-cabin side of a windshield of the vehicle.

* * * * *